United States Patent
Lutz (10) Patent No.: US 10,346,130 B2
(45) Date of Patent: Jul. 9, 2019

(54) HANDLING FLOATING POINT OPERATIONS

(71) Applicant: ARM Limited, Cambridge (GB)

(72) Inventor: David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 15/593,574

(22) Filed: May 12, 2017

(65) Prior Publication Data

US 2018/0329682 A1    Nov. 15, 2018

(51) Int. Cl.
*G06F 7/483* (2006.01)
*G06F 7/485* (2006.01)
*G06F 5/01* (2006.01)

(52) U.S. Cl.
CPC .............. *G06F 5/012* (2013.01); *G06F 7/483* (2013.01); *G06F 7/485* (2013.01)

(58) Field of Classification Search
CPC ...................................................... G06F 7/485
See application file for complete search history.

(56) References Cited

U.S. PATENT DOCUMENTS

| | | | | |
|---|---|---|---|---|
| 5,197,023 A | * | 3/1993 | Nakayama | G06F 7/485 708/496 |
| 7,043,516 B1 | * | 5/2006 | Wolrich | G06F 7/485 708/505 |
| 2010/0042665 A1 | * | 2/2010 | Ahmed | G06F 7/485 708/209 |
| 2013/0282777 A1 | * | 10/2013 | Guo | G06F 7/483 708/201 |

* cited by examiner

*Primary Examiner* — Chuong D Ngo
(74) *Attorney, Agent, or Firm* — Nixon & Vanderhye P.C.

(57) ABSTRACT

A data processing apparatus includes difference circuitry that calculates a difference between exponents of a first floating-point operand and a second floating-point operand. Shift circuitry generates a fractional string by shifting fractional bits of a selected operand of the first floating-point operand and the second floating-point operand based on the difference. Logic circuitry generates an integer-bit string representing an integer-bit of the selected operand having been shifted based on the difference. Combining circuitry combines the fractional string and the integer-bit string to produce a significand string representing the selected operand having been shifted based on the difference. The logic circuitry generates the integer-bit string using operations other than shifting.

15 Claims, 7 Drawing Sheets

HANDLING FLOATING POINT OPERATIONS

TECHNICAL FIELD

The present disclosure relates to data processing. In particular, the present disclosure has relevance to the field of floating-point operations.

DESCRIPTION

A floating-point operand represents a number as a significand multiplied by a base number (typically two), raised to the power of an exponent. The exponent and the significand are represented using a number of bits in the operand. Adding or subtracting two floating-point operands together can involve firstly aligning the decimal points of the numbers by equalising the exponents. This can be non-trivial. Furthermore, it may be necessary to analyse bits that are shifted as a consequence of the alignment. However, the time taken to perform this analysis can be time consuming. These problems are exacerbated if subnormal inputs, where the integer-bit is 0, are also to be considered.

SUMMARY

Viewed from a first example configuration, there is provided a data processing apparatus comprising: difference circuitry to calculate a difference between exponents of a first floating-point operand and a second floating-point operand; shift circuitry to generate a fractional string by shifting fractional bits of a selected operand of said first floating-point operand and said second floating-point operand based on said difference; logic circuitry to generate an integer-bit string representing an integer-bit of said selected operand having been shifted based on said difference; and combining circuitry to combine said fractional string and said integer-bit string to produce a significand string representing said selected operand having been shifted based on said difference, wherein said logic circuitry is to generate said integer-bit string using operations other than shifting.

Viewed from a second example configuration, there is provided a data processing apparatus comprising: difference circuitry to calculate a difference between exponents of a first floating-point operand and a second floating-point operand, wherein a significand associated with one of said first floating-point operand and said second floating-point operand comprises one or more core bits and one or more outshifted bits; splitter circuitry to separate said core bits of said first floating-point operand into a plurality of groups of bits, each of said groups of bits comprising contiguous bits from said core bits; a plurality of group bit generation circuits, to output a plurality of group bits by performing a logical OR on said plurality of groups of bits, and on said outshifted bits; and calculation circuitry to set a carry signal based on a result of a logical OR of at least of subset of said plurality of group bits, wherein said at least a subset is based on said difference.

Viewed from a third example configuration, there is provided a method of data processing comprising: calculating a difference between exponents of a first floating-point operand and a second floating-point operand; generating a fractional string by shifting fractional bits of a selected operand of said first floating-point operand and said second floating-point operand based on said difference; generating an integer-bit string representing an integer-bit of said selected operand having been shifted based on said difference; and combining said fractional string and said integer-bit string to produce a significand string representing said selected operand having been shifted based on said difference, wherein said integer-bit string is generated using operations other than shifting.

Viewed from a fourth example configuration, there is provided a method of data processing comprising: calculating a difference between exponents of a first floating-point operand and said a floating-point operand, wherein a significand associated with one of said first floating-point operand and said second floating-point operand comprises one or more core bits and one or more outshifted bits; separating said core bits of said first floating-point operand into a plurality of groups of bits, each of said groups of bits comprising contiguous bits from said core bits; output a plurality of group bits by performing a logical OR on said plurality of groups of bits, and on said outshifted bits; and setting an inhibit carry signal based on a logical OR of at least a subset of said plurality of group bits, wherein said at least a subset is based on said difference.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: difference circuitry to calculate a difference between exponents of a first floating-point operand and a second floating-point operand; shift circuitry to generate a fractional string by shifting fractional bits of a selected operand of said first floating-point operand and said second floating-point operand based on said difference; logic circuitry to generate an integer-bit string representing an integer-bit of said selected operand having been shifted based on said difference; and combining circuitry to combine said fractional string and said integer-bit string to produce a significand string representing said selected operand having been shifted based on said difference, wherein said logic circuitry is to generate said integer-bit string using operations other than shifting.

The first floating-point operand and the second floating-point operand are both floating-point numbers. Accordingly, they both have a separate exponent and significand as well as a sign bit. The difference circuitry takes the exponents of each of the first floating-point operand and the second floating-point operand and calculates a difference between those values. The shift circuitry takes the fractional/significand bits of one of the first floating-point operand and second floating-point operand and generates a shifted fractional string based on the difference between the exponents. The fractional bits are part of the significand, which also includes an integer-bit (either zero or one). Logic circuitry generates an integer-bit string that represents an integer-bit of the selected one of the first floating-point operand and second floating-point operand. Again, the integer-bit string represents the integer-bit of the selected operand having been shifted based on a difference between the exponents as calculated by the difference circuitry. Combining circuitry then combines the fractional string and the integer-bit string in order to produce an overall significand string that represents the selected one of the first floating-point operand and the second floating-point operand having been shifted based on the difference between the exponents. In this way, the shift circuitry and the logic circuitry separate out different parts of the significand (the fractional bits and the integer-bit) and each perform an operation that corresponds with the fractional bits or the integer-bit having been shifted based on the difference between the exponents. By separating the generation of the significand string out into two separate processes, the overall determination of the significand string can proceed more efficiently. In addition, the logic circuitry is to generate the integer-bit string using operations other than shifting. Shifting operations can be time consuming and can require a large number of logic gates in order to proceed. Accordingly, the logic circuitry generates the integer-bit string using operations other than shifting. The generation of the significand string is used in order to align the significands of the first floating-point operand and the second floating-point operand. Once the two significands have been aligned, it is possible to perform addition or subtraction between the two values.

In some embodiments, said logic circuitry is to generate said integer-bit string by performing, for each bit position in said integer-bit string, an associated computation using bits of said difference to determine a value for that bit position within said integer-bit string, said associated computation being different for different bit positions. The integer-bit string can be generated by, for each bit in the integer-bit string, performing a separate computation using bits of the exponent difference to determine a value for that bit position. The computation may differ for each of the different bit positions within the integer-bit string. In particular, the computation may vary by different inputs being provided, i.e. by varying the bits of the exponent different or by performing additional computations to those bits.

In accordance with some embodiments, said associated computation for each bit position in said integer-bit string is at least logically equivalent to a computation that uses each bit of the exponent value at most once. The difference calculated between the two exponent values may be expressed as a number of bits. In these embodiments, the computation that is performed for each bit position in the integer-bit string uses each of those bits once or is logically equivalent (once redundant operations are removed or simplified) to a computation in which each of those bits is used once.

In some embodiments said associated computation for each bit position in said integer-bit string performs a sequence of logical operations on said bits of said difference. The computation that is performed for each bit position in the integer-bit string may consist or comprise a sequence of logical operations on the bits of the difference calculated between the two exponents. In particular, in some embodiments, said sequence of logical operations comprises one or more of AND, OR and NOT operations.

In some embodiments, said logic circuitry is to operate at least partly in parallel with said difference circuitry. The difference circuitry may output one bit of the exponent difference at a time. In this way, the logic circuitry can begin to operate once a first bit of the difference has been output. The overall output of the difference circuitry and the overall computation performed by the logic circuitry are therefore substantially in parallel. In particular, the behaviour of each of the circuitries overlaps at least partly. In some other embodiments, the logic circuitry and the difference circuitry operates completely in parallel.

In some embodiments, said logic circuitry has a logic depth no greater than a logic depth of said difference circuitry, and as such, the introduction of the logic circuitry does not add additional delay to the operation of the difference circuitry. Consequently, the number of elements on the "critical path" can be kept low, and therefore the overall delay caused by performing the calculation of the significand string can be kept low.

In some embodiments, said difference circuitry outputs said difference as a plurality of bits in order from least significant to most significant; and at least one of said shift circuitry and said logic circuitry generate said fractional string and said integer-bit string respectively based on a subset of least significant bits from said plurality of bits. The shift circuitry and/or the logic circuitry may therefore generate the fractional string and/or integer-bit string respectively based on only a small number of least significant bits representing the difference between the exponents of the first floating-point operand and the second floating-point operand. In other words, the difference circuitry may only initially output a small number of bits representing this difference. This small number of bits may be used by shift circuitry and/or the logic circuitry. In this way, the shift circuitry and/or the logic circuitry may react quickly, before the entire difference between the two exponents is fully calculated.

In some embodiments, said subset of least significant bits from said plurality of bits comprises 4 bits. In such embodiments, the difference that is used by the shifting circuitry and the logic circuitry can have a maximum value of 15.

In some embodiments, said shifting circuitry is to generate said fractional string in response to a first bit being output by said difference circuitry. Consequently, once the difference circuitry starts to output bits representing the difference between the two exponents, the shifting circuitry is able to begin generating the fractional string. The fractional string and the difference circuitry may therefore operate at least partially in parallel. This can therefore reduce the overall time required for the data processing apparatus to function.

In some embodiments, said logic circuitry takes as inputs said difference and an indication of whether said integer-bit of said selected operand is zero. If the integer-bit of the selected operand is zero, then the input operand may be subnormal. This represents a floating-point number that is not in normalised format and may be treated differently for the purposes of computation.

In some embodiments, said shift circuitry is further to expand said fractional string during said shifting, based on said difference. It is often common, during shifting, to discard bits that extend beyond the reach of the initial value. For example, in the case of an integer, if the values are right shifted sufficiently such that they go past the decimal point, those numbers are typically lost (possibly after rounding is performed depending on the underlying architecture). In these embodiments, when the bits are shifted, the value is expanded such that the bits are kept. Consequently, a value that was initially ten bits long, if shifted four times, would result in being fourteen bits long. Since the exponent difference determines the extent to which shifting occurs, the expansion of the fractional string is based on the difference.

In some embodiments, one of said first floating-point operand and said second floating-point operand comprises a larger number of bits. A larger operand can result from a multiply-accumulate operation in which a value or set of values is multiplied and added together. This operation can result in large numbers, and consequently the result may need to be expressed in a larger number of bits.

In some embodiments, said data processing apparatus comprises: a set of circuits comprising said difference circuitry, said shift circuitry, said logic circuitry, and said combining circuitry; and a further set of circuits comprising further difference circuitry, further shift circuitry, further logic circuitry, and further combining circuitry, wherein said difference circuitry and said further difference circuitry are to subtract an exponent of said selected operand from an exponent of said other operand; and said selected operand is different between said set of circuits and said further set of circuits. In such embodiments, each of the sets of circuits and the further set of circuits determines a different exponent difference by varying whether the exponent of the first floating-point operand is subtracted from the exponent of the second floating-point operand or vice versa. Accordingly, rather than determine which of the first floating-point operand or second floating-point operand is larger, the set of circuits and further set of circuits collectively perform calculations based on both possibilities. Once the differences have been fully calculated, it is possible to determine which of the two values is larger, and therefore one of the calculations performed by either the set of circuits or further set of circuits can be discarded. In this way, both possibilities are determined, rather than waiting for a determination of how the calculation should be performed. This results in the apparatus operating more quickly than if the larger of the two exponents was determined beforehand.

In some embodiments, said data processing apparatus comprises: selection circuitry to select from said significand strings produced by said set of circuits and said significand string produced by said further set of circuits, wherein in response to said set of circuits having a smaller selected operand than in said set of further circuits, said selection circuitry selects said significand string produced by said set of circuits, otherwise said selection circuitry selects said significand string produced by said further set of circuits. The selection circuitry therefore selects the significand string produced by either the set of circuits or the further set of circuits. This determination is based on which of the operands is determined to be smaller. In general, this will be determined based on the exponent difference between the two floating-point operands. Since the selection takes place after the significand strings have been produced, it will be known at this time which of the two operands is larger. Since the information regarding which exponent is larger is not needed upfront it is possible for the data processing apparatus to operate more quickly without waiting for that information to become available.

In accordance with a second example configuration there is provided a data processing apparatus comprising: difference circuitry to calculate a difference between exponents of a first floating-point operand and a second floating-point operand, wherein a significand associated with one of said first floating-point operand and said second floating-point operand comprises one or more core bits and one or more outshifted bits; splitter circuitry to separate said core bits of said first floating-point operand into a plurality of groups of bits, each of said groups of bits comprising contiguous bits from said core bits; a plurality of group bit generation circuits, to output a plurality of group bits by performing a logical OR on said plurality of groups of bits, and on said outshifted bits; and calculation circuitry to set a carry signal based on a result of a logical OR of at least of subset of said plurality of group bits, wherein said at least a subset is based on said difference.

The outshifted bits may be, for example, bits that were shifted beyond the original size of the significand and were kept rather than being discarded. This shifting could be, for example, based on the difference between the exponents as calculated by the different circuitry. In any event, the splitter circuitry separates the core bits (i.e. the non outshifted bits) into a plurality of groups of bits. Each of the groups of bits comprises contiguous bits in the core bits. A plurality of group bit generation circuits then generates a group bit for each of the groups by performing a logical OR on the bits that make up each of those groups. In addition, a group bit generation circuit calculates a group bit for the bits making up the outshifted bits. The calculation circuitry calculates the carry signal by performing a logical OR on at least a subset of the plurality of group bits that have been calculated by the group bit generation circuits. The at least subset is based on the difference calculated by the difference circuitry. The difference circuitry will affect the amount of shifting that occurs. However, the bits that are shifted past the limit of the significand (i.e. those bits that would eventually be discarded) can affect the calculation of the difference between the first floating-point operand and the second floating-point operand. In particular, the difference may be calculated by adding the inverse of one of the operands and adding one. It is therefore necessary to know whether all of the outshifted bits including those bits that will eventually shifted out, are zero. If all such bits are zero, then when inverted those bits are inverted, they will become ones. At that point the addition of a further one causes a "carry" which must be adjusted for. By performing a logical OR on groups of bits, it is possible to make the determination of whether such a carry will occur in parallel and therefore determine whether a carry signal should be set or not more quickly than if a logical OR is performed on a bit by bit basis.

In some embodiments, said groups of bits are formed by splitting off 16 bits of said core bits starting from least significant bits of said core bits. If the difference indicates that further shifting will take place as multiples of sixteen, then the bits can be treated in groups of 16 in order to more quickly perform the computation when necessary.

In some embodiments, each of said plurality of group bit generation circuits performs said logical OR substantially in parallel. By performing the logical OR substantially in parallel, the overall logical OR of all of the bits can be calculated more quickly than if these determined on a bit by bit basis.

In some embodiments, said data processing apparatus comprises: adder circuitry to perform an addition based on core bits except those represented by said plurality of group bits, and a second operand, wherein said adder circuitry is to also add a value '1' based on said carry signal. The difference between two values can be calculated using addition circuitry. This is performed by taking the ones compliment (i.e. the inversion) of one of the values and adding it to the other value together with the value 1. In this case, the addition of the value 1 has no effect unless all of the outshifted bits are also one, in which case a carry occurs. The carry signal can be calculated quickly by performing a small number of OR operations as necessary based on the group bits that have been determined (potentially in parallel).

Particular embodiments will now be described with reference to the figures.

Floating-point (FP) is a useful way of approximating real numbers using a small number of bits. The IEEE 754-2008 FP standard proposes multiple different formats for FP numbers. Some of these include binary 64 (also known as double precision, or DP), binary 32 (also known as single precision, or SP), and binary 16 (also known as half precision, or HP). The numbers 64, 32, and 16 refer to the number of bits required for each format.

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with "_" characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software.

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

Figure 1:
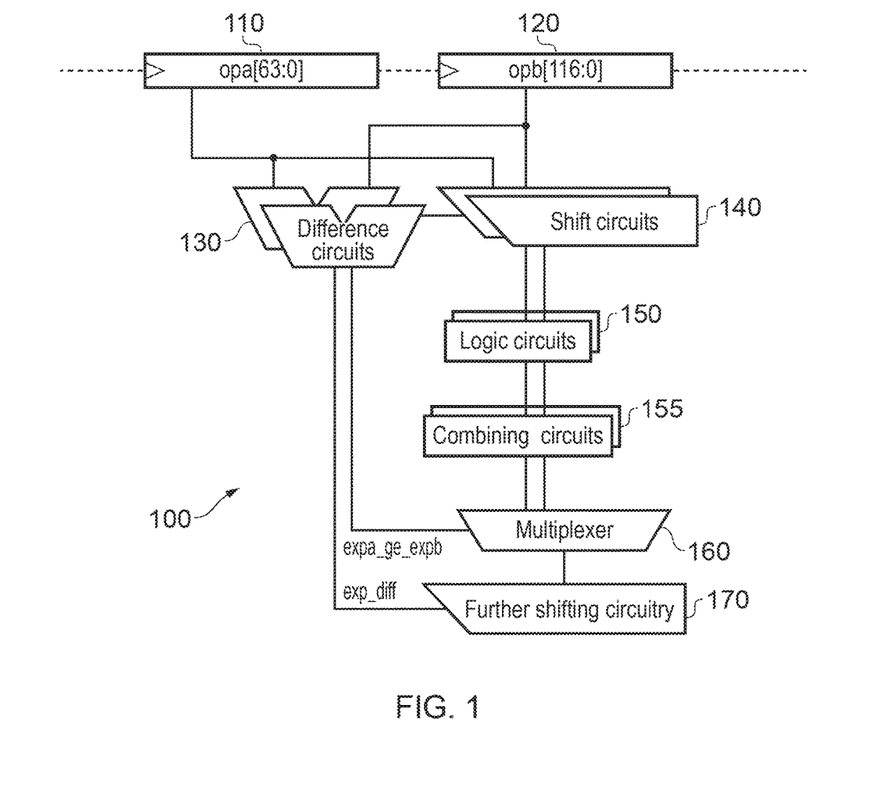
FIG. 1 illustrates a data processing apparatus 100 in accordance with one embodiment.

FIG. 1 illustrates a data processing apparatus 100 in accordance with one embodiment. A first floating-point operand a 110 and a second floating-point operand b 120 are provided. The first floating-point operand 110 is made up of 64 bits and the second floating-point operand 120 is made up of 117 bits. The bits of each operand include an exponent, a significand, and a sign. In this embodiment, the second floating-point operand 120 is expressed using more bits than the first floating-point operand 110. This may be as a result of the second floating-point operand being used as part of a fused multiply-add operation. In this embodiment, if one of the operands was to be added or subtracted to/from the other operand, it is firstly necessary to align the two operands so that the decimal points and exponents match. To do this, the smaller number is right shifted a number of times until it represents the same exponent as the larger number. However, in this embodiment, rather than determining which number is smaller, the circuitry is paired up to calculate both possibilities simultaneously. Once these have been calculated, it will be known which operand was smaller, and the result obtained from the larger operand can be discarded.

The two operands 110, 120 are provided to a pair of difference circuits 130. The difference circuits 130 calculate the difference between the exponents expa, expb of the first floating-point operand 110 and the second floating-point operand 120. However, one of the difference circuits calculates expa–expb and the other calculates expb–expa. The difference circuits 130 are to start outputting bits of the result as soon as each bit is ready, from least significant bit to most significant bit. The results are passed to a pair of shift circuits 140.

Each of the shift circuits 140 takes a partial result from the difference circuits 130 and uses this information to right shift the fractional bits of one of the first floating-point operand a 110 and the second floating-point operand b 120. In particular, the partial difference of expa–expb is used to right shift the fractional bits of the second floating-point operand b 120 while the partial difference of expb–expa is used to right shift the fractional bits of the first floating-point operand a 110. At least one of the values expa–expb or expb–expa will be non-negative. The fractional bits correspond to the bits of the significand after the decimal point. Consequently, for a significand 1.011011110, the fractional bits would constitute those bits that represent 0.011011110. Since the output of the difference circuits 130 comes one bit at a time, the shifting also occurs one bit at a time. For example, if the least significant bit of expa–expb is '1' then a one bit right shift occurs to the fractional bits of the second floating-point operand b 120. If the next least significant bit of expa–expb is '1' then a two bit right shift occurs to the fractional bits of the first floating-point operand a 110. In this embodiment, the first four bits output by the difference circuits 130 are considered, which produces a maximum of 15 shifts to the right for the fractional bits. While performing this shifting, the size of the data type is expanded to match. Consequently, there may be up to 15 more fractional bits at the end of the process than there were originally so that bits are not lost during the shifting. The output of the shifting is a pair of fractional bit strings, one produced by each of the shifting circuits.

Logic circuits 150 are provided to generate an integer-bit string. In contrast to the shifting string that deals with the fraction bits, the logic circuits 150 deal with the integer-bit (s), also known as the T bit. The output of the logic circuits 150 therefore corresponds with the integer-bits having been shifted a number of time in dependence on the partial result of the exponent difference (i.e. the four least significant bits) output by the difference circuits. Again, an integer-bit string is generated in respect of both the first floating-point operand 110 and the second floating-point operand 120. The logic circuits 150 operate without performing a bit shift operation. By avoiding the use of shifting, the integer-bit strings can be generated more quickly. The behaviour of these circuits is discussed in more detail with respect to FIG. 2.

Having calculated the fractional string and the integer-bit string, combining circuits 155 are then used to combine the fractional string and the integer-bit string to produce a pair of significand strings. Each of the significand strings corresponds with one of the floating-point operands 110, 120 having been shifted based on the partial difference produced from the difference circuits. Such combining circuits 155 can be implemented by performing a logical OR on the two components. A multiplexer 160 acts as selection circuitry to select one of the significand strings. The selection is made based on a signal from the difference circuits 130 as to whether exponent a or exponent b is smaller. The significand string corresponding with the partial shifting of the smaller floating-point operand is kept while the other is discarded. Note that it is not initially known which of the two exponents is larger. However, by the time the integer-bit strings and fractional strings are generated and used to generate the significand strings, such information is available from the difference circuits 130.

In this embodiment, further shifting circuitry 170 is provided in order to complete the right shift, thereby aligning the two operands. The right shift is completed by the use of the full exponent difference produced by the difference circuits 130. Again, although this information is not initially available, it becomes available by the time it is needed by the further shifting circuitry 170.

Accordingly, it can be seen that by the use of partial exponent difference information, and the use of logic circuitry in which shifting is not used in order to generate an integer-bit string, it is possible to perform alignment of two floating-point operands more quickly, in preparation for addition or subtraction of those operands.

The logic circuitry produces a 16-bit integer-bit string by performing a number of logic operations (specifically AND, OR, or NOT operations) on bits of the exponent difference and an indicator of whether the biased exponent of the selected floating-point operand is zero. For example, if rs_a[3:0] represents the low-order four bits of expa-expb and if expa_zero indicates that the biased exponent of the first floating-point operand a is zero then the 16 bit integer-bit string can be calculated with the following logic:

$jloca[105]=\sim exp\_a\_zero\&\sim rs\_a[3]\&\sim rs\_a[2]\&\sim rs\_a[1]\&\sim rs\_a[0]$ $jloca[104]=\sim exp\_a\_zero\&\sim rs\_a[3]\&\sim rs\_a[2]\&\sim rs\_a[1]\&rs\_a[0]$ $jloca[103]=\sim exp\_a\_zero\&\sim rs\_a[3]\&\sim rs\_a[2]\&rs\_a[1]\&\sim rs\_a[0]$ $jloca[102]=\sim exp\_a\_zero\&\sim rs\_a[3]\&\sim rs\_a[2]\&rs\_a[1]\&rs\_a[0]$ $jloca[101]=\sim exp\_a\_zero\&\sim rs\_a[3]\&rs\_a[2]\&\sim rs\_a[1]\&\sim rs\_a[0]$ $jloca[100]=\sim exp\_a\_zero\&\sim rs\_a[3]\&rs\_a[2]\&\sim rs\_a[1]\&rs\_a[0]$ $jloca[99]=\sim exp\_a\_zero\&\sim rs\_a[3]\&rs\_a[2]\&rs\_a[1]\&\sim rs\_a[0]$ $jloca[98]=\sim exp\_a\_zero\&\sim rs\_a[3]\&rs\_a[2]\&rs\_a[1]\&rs\_a[0]$ $jloca[97]=\sim exp\_a\_zero\&rs\_a[3]\&\sim rs\_a[2]\&\sim rs\_a[1]\&\sim rs\_a[0]$ $jloca[96]=\sim exp\_a\_zero\&rs\_a[3]\&\sim rs\_a[2]\&\sim rs\_a[1]\&rs\_a[0]$ $jloca[95]=\sim exp\_a\_zero\&rs\_a[3]\&\sim rs\_a[2]\&rs\_a[1]\&\sim rs\_a[0]$ $jloca[94]=\sim exp\_a\_zero\&rs\_a[3]\&\sim rs\_a[2]\&rs\_a[1]\&rs\_a[0]$ $jloca[93]=\sim exp\_a\_zero\&rs\_a[3]\&rs\_a[2]\&\sim rs\_a[1]\&\sim rs\_a[0]$ $jloca[92]=\sim exp\_a\_zero\&rs\_a[3]\&rs\_a[2]\&\sim rs\_a[1]\&rs\_a[0]$ jloca[91]=~exp a_zero&rs_a[3]&rs_a[2]&rs_a[1]
&~rs_a[0]

jloca[90]=~exp a_zero&rs_a[3]&rs_a[2]&rs_a[1]
&rs_a[0]

Figure 2:
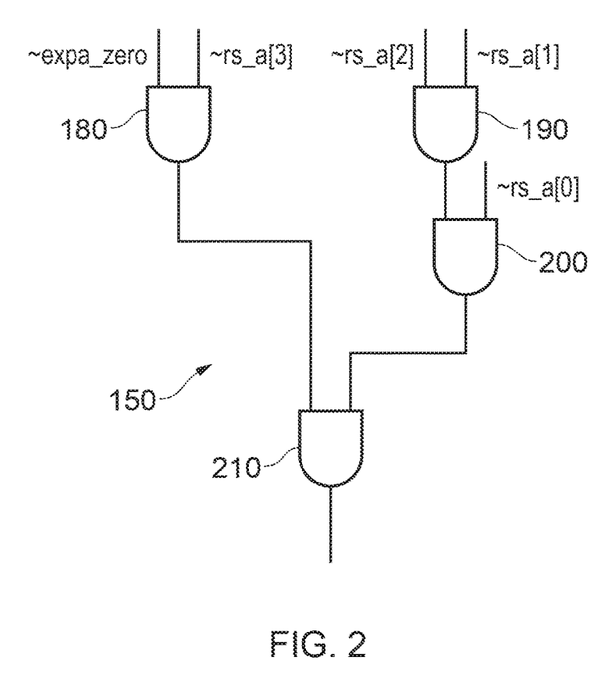
FIG. 2 illustrates appropriate logic circuitry for determining a bit of the integer-bit string.

FIG. 2 illustrates appropriate logic circuitry 150 for determining one of these bits (e.g. jloca[105]). The circuitry can be made up from a number of AND gates 180, 190, 200, 210 and a number of NOT gates (to invert the inputs as appropriate). Having calculated each of the bits, the bits can be combined together using OR gates. Although such circuitry may have to wait to determine the value of expa_zero, the much lower logic depth makes it possible for the integer-bit string to be produced at a similar time to the fractional string. The fractional string and integer-bit string can be combined using OR gates.

Figure 3:
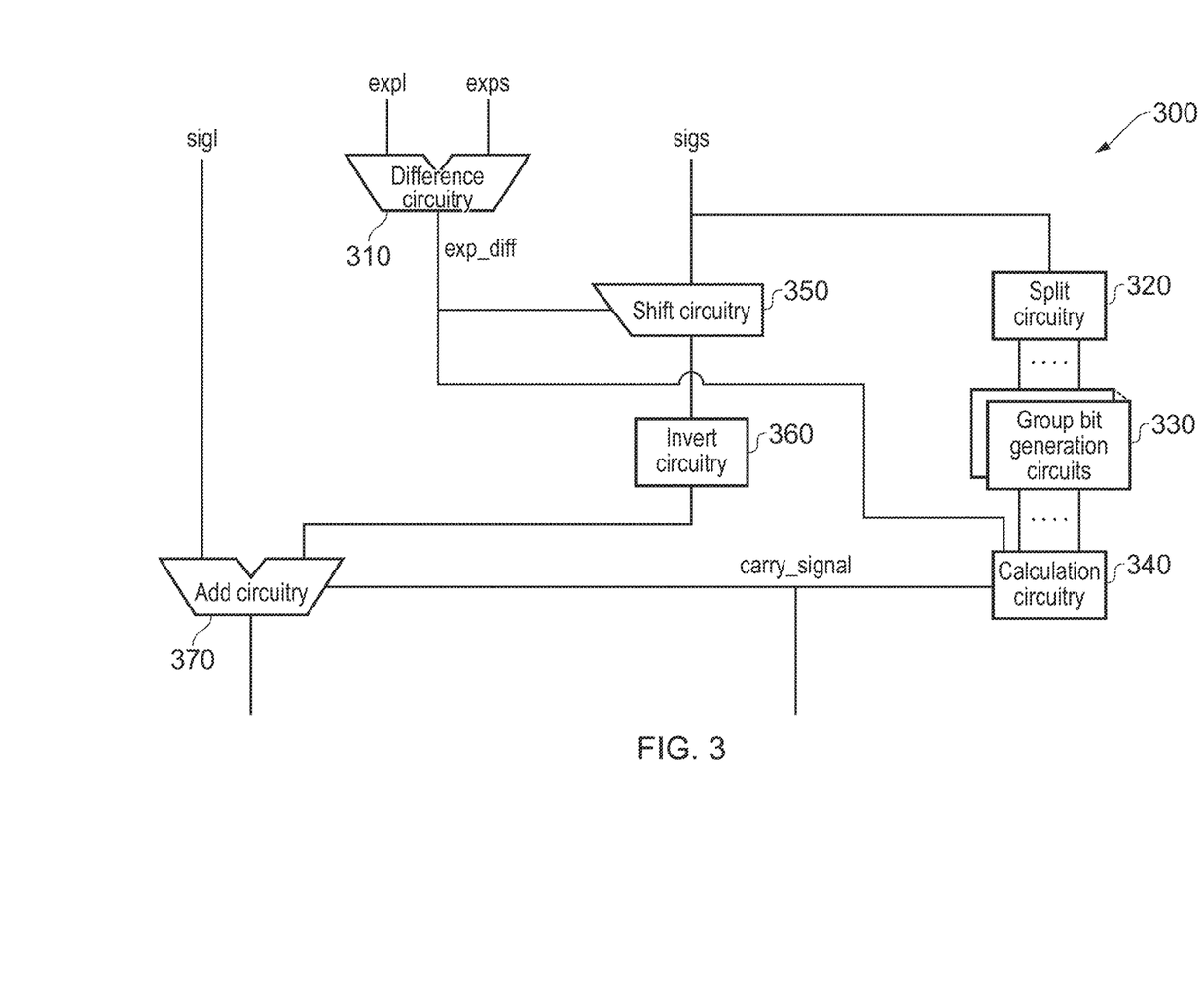
FIG. 3 illustrates a data processing apparatus in accordance with one embodiment.

FIG. 3 illustrates a data processing apparatus 300 in accordance with one embodiment. Difference circuitry 310 determines the difference between the exponents of a smaller floating-point exponent exps and a larger floating-point exponent expl, exp_diff. In this embodiment, exp_diff represents the entire difference between the two exponents rather than merely the least significant bits of the difference.

The value 'sigs' represents the significand of the smaller exponent exps. The significand has been at least partially aligned. In other words, sigs is the significand that would result if the smaller of a first floating-point operand and a second floating-point operand were right shifted a maximum of 16 times in order to bring the exponents of the two floating-point operands closer together (or to make them match). Such a significand could be the output of the multiplexer 160 in FIG. 1.

As a consequence of the alignment, some of the bits that make up the significand of sigs may have been outshifted. These are bits that might ordinarily be disregarded due to being shifted beyond the capacity of the data type. For example, if a significand is limited to 53 bits (as is the case in a double precision floating-point number) then if a 53-bit significand is right shifted once, there would be one outshifted bit. Rather than being discarded, these bits are temporarily kept. The remaining bits are referred to as core bits. In this embodiment, it is assumed that there is a maximum of 16 outshifted bits.

The value 'sigs' is passed to split circuitry 320, which splits the bits into a number of groups of contiguous bits. The first group is made up of all the outshifted bits. Other groups are made by splitting the remaining contiguous bits of sigs into groups of 16 bits. A set of group bit generation circuits 330 is provided. For each group of bits, a group bit is generated by performing a logical OR over the bits in that group. In some embodiments, the group bit corresponding to the outshifted bits may already have been calculated.

Note that in this embodiment, the group bit generation circuits operate substantially in parallel. For example, the operation of at least some of the group bit generation circuits overlap each other.

Approximately simultaneously, shift circuitry 350 performs additional right shifting on the value sigs in order to complete the alignment of sigs with sigl, the unshifted significand of the larger of the two floating-point operands. This shifting is performed based on exp_diff, the difference between the exponents of the two floating-point operands as calculated by the difference circuitry 310. In this embodiment, since a partial alignment of sigs has already been performed based on the four least significant bits of exp_diff, the shift circuitry 350 need only perform a 16-bit, 32-bit and/or 64-bit shift. In other words, the shift will be a multiple of 16.

At this point, it is necessary to consider whether or not the addition of opa and opb is an unlike-sign addition (USA) or a like-sign addition (LSA). In a like-sign addition (adding a positive number to a positive number, or a negative number to a negative number), the operation is performed by simply adding the numbers together. For example, the operation (+2)+(+3) involves adding '2' to '3' to get '5'. Similarly, the operation (−2)+(−3) is achieved by adding '2' to '3' and to get '5' and then making the result negative to give '−5'. In either case, because the signs are the same, the effective operation is an addition operation. In an unlike-sign addition (adding a positive number to a negative number, or a negative number to a positive number), the operation becomes an effective subtraction. For example, the operation (−2)+(+3) involves subtracting '2' from '3' to give '1'. Similarly, the operation (2)+(−3) involves subtracting '3' from '2' to give '−1'. Hence, even if the underlying intent is to perform an addition, it could be calculated by actually performing a subtraction.

However, in practice, a subtraction can also be performed by performing an addition. In particular, for two operands ops and opl having different signs, the addition of ops and opl, which is equivalent to opl−ops is computed as opl+~ops+1. In other words, the value ops is inverted (ones complement) and added to opl, together with the value '1'. The addition of the value '1' can be achieved by a carry-in at addition circuitry. In the present case, it is likely that the additional +1 will be subsumed within the outshifted bits. However, if all of the outshifted bits are initially 0 then when these are inverted they will all become 1. In this case, the addition of 1 to those outshifted bits will cause a carry into the core bits. This in turn necessitates adding 1 to the core bits that form the final significand.

As previously explained, the shift circuitry 350 performs the final alignment of the smaller significand sigs. This is then provided to invert circuitry 360 that inverts this value, if appropriate. In particular, the value is inverted if an USA is taking place. The output is then provided to addition circuitry 370, together with the larger unshifted significand sigl.

In the present embodiment, calculation circuitry 340 is provided to determine whether the outshifted bits (including initial core bits that are subsequently outshifted by the shift circuitry 350) are all 0. Rather than performing an OR over all bits as they are shifted by the shift circuitry 350, which would be time consuming, the present embodiment instead performs a logical OR over some of the group bits produced by the group bit generation circuits 330. In particular, the group bit representing the initially outshifted bits is ORed together with group bits representing groups of bits that are shifted by the shift circuitry 350. Since, in this embodiment, the shift circuitry 350 will only perform a 16-bit, 32-bit, or 64-bit shift, a multiple of 16-bits will be shifted by the shift circuitry 350. Consequently, by virtue of the group-bit generation circuits calculating group bits of each group of 16 contiguous bits following the initially outshifted bits, it is only necessary to perform a logical OR over a small number of group bits. This operation is performed by calculation circuitry 340. For example, if 7 bits are initially outshifted bits, and the exp_diff produced by the difference circuitry 310 indicates that a further shift of 48 bits is required, then the group bits representing the first 7 bits, the following 16 bits, the 16 bits following those, and the 16 bits following those (4 group bits in total) need be logically ORed by the calculation circuitry 340 in order to determine whether any of the bits that have been shifted is '1' or not. Even a single '1' in those shifted bits will cause the '1' performed by the addition to be subsumed. In the event of a fused multiply-add operation being performed, this final logical OR additionally includes any sticky bit indication from the multiplier.

The resulting calculation performed by the calculation circuitry 340 is used to determine a carry signal, which indicates whether or not a carry-in value (of 1) should be added at the addition circuitry 370. In particular, if the result of the final logical OR is '0' and if a USA is occurring then the carry signal is set to indicate that a '1' should be added. Otherwise, a '1' is not added. It will be appreciated, of course, that the inverse could also be indicated (i.e. an "inhibit carry signal" could be provided, with the reverse requirements).

By calculating the group bits substantially in parallel and by using such group bits to indicate whether a carry value of '1' should be provided to addition circuitry 370, it is possible to efficiently implement the addition of the significands. The group bits can also be used for the purposes of rounding, as will be discussed with reference to FIG. 5.

Figure 4:
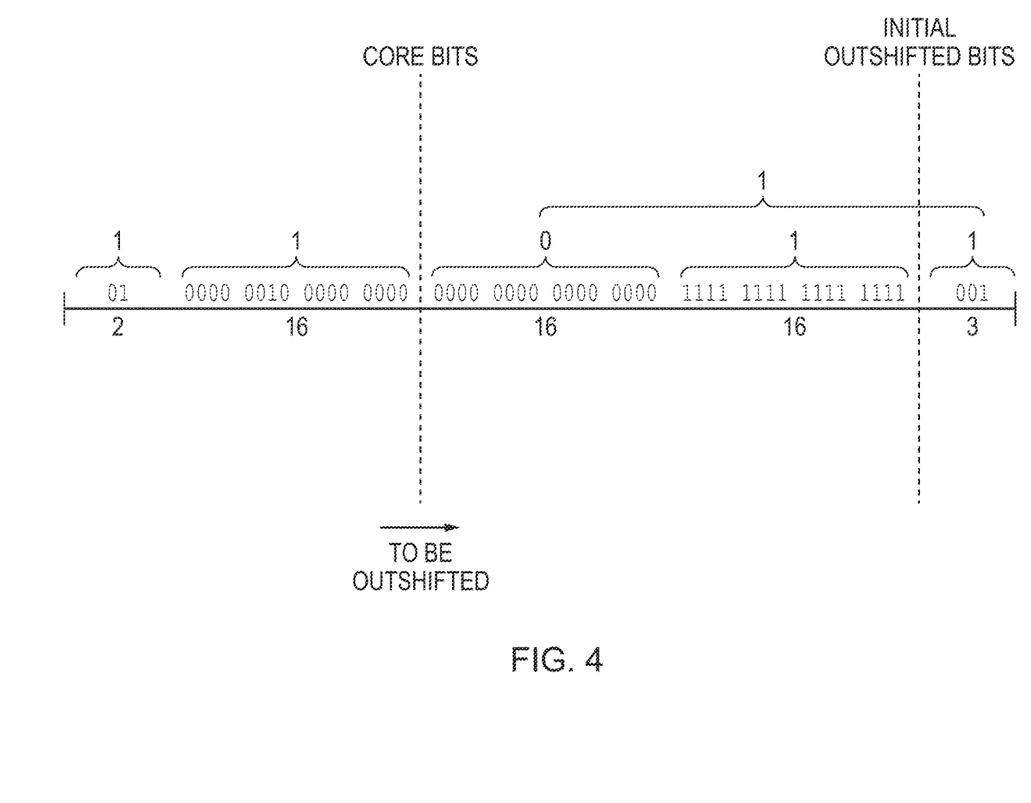
FIG. 4 illustrates an example of the makeup of sigs), the corresponding group bits, and the calculation of the carry signal.

FIG. 4 illustrates an example of the makeup of sigs, which comprises 53 bits in this example (i.e. sigs corresponds to the significand of a double precision floating-point number), the corresponding group bits, and the calculation of the carry signal. In this example, three bits have been initially outshifted, e.g. from circuitry such as that shown in FIG. 1. Three groups of 16 bits have then been formed by starting from the lowest order bits of said core bits. A final group of bits is formed from the remaining two bits. For each of these five groups, a group bit is formed by performing a logical OR on the bits within that group. This therefore provides five group bits. Although three bits have initially been outshifted, the alignment of sigs is not yet complete. Difference circuitry 310 then indicates that a further shift of 32 bits should occur, which will result in a further 32 bits being outshifted. Rather than performing a logical OR over all 35 outshifted bits, it is now only necessary to perform a logical OR over the three group bits corresponding to the groups that have been outshifted. The result of this is a '1', meaning that the carry signal will not be set. This is because at least one of the outshifted values is a '1', meaning that when it is inverted, it will become '0'. Hence when the value '1' is added, an overflow will not occur and the remaining core bits (those that have not been outshifted) will not be affected.

Figure 5:
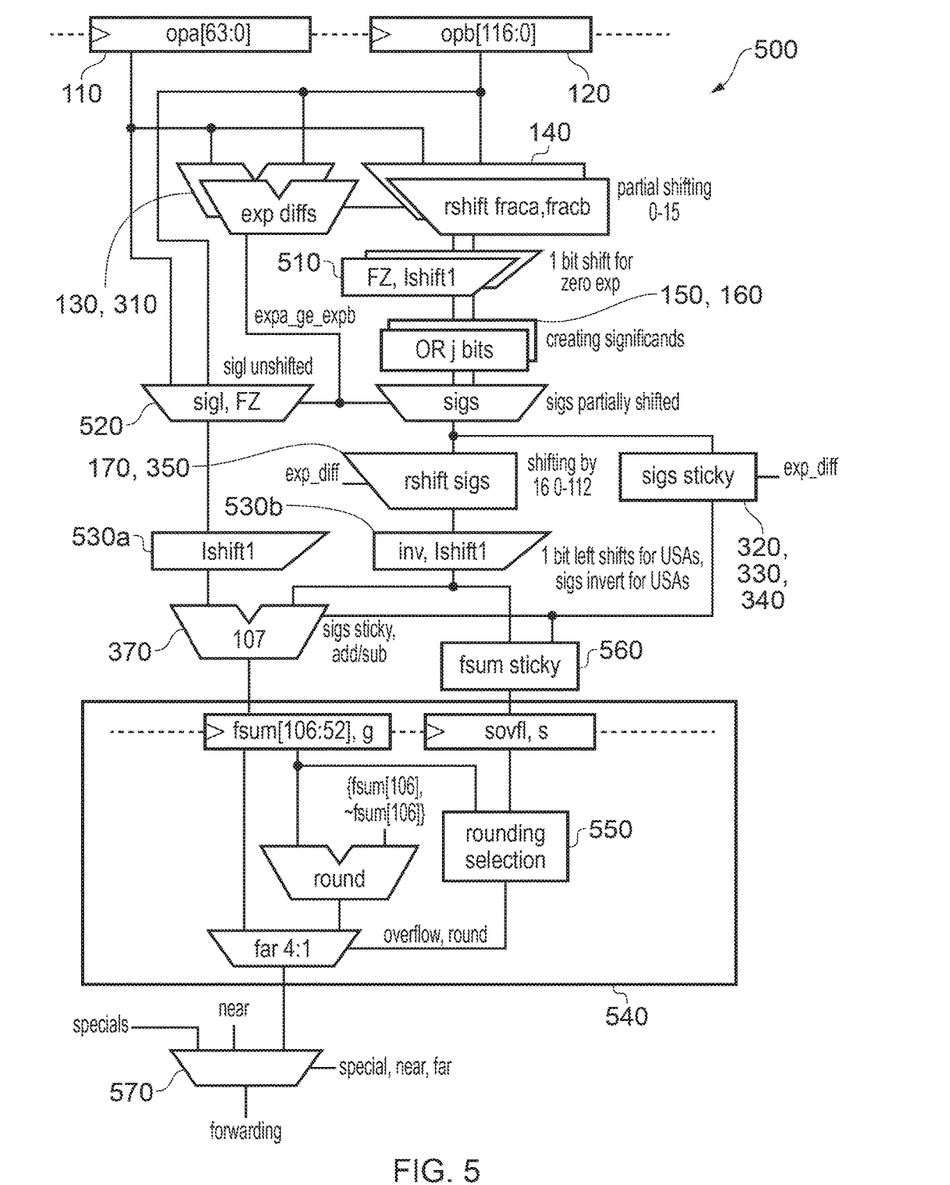
FIG. 5 illustrates floating-point addition circuitry 500 in accordance with one embodiment.

FIG. 5 illustrates floating-point addition circuitry 500 in accordance with one embodiment. This embodiment incorporates the circuitry in the embodiment of FIG. 1 and the circuitry in the embodiment of FIG. 4, and adds circuitry for handling rounding. The same reference numerals have been provided where a feature in the embodiment of FIG. 5 corresponds with features from the embodiments of FIG. 1 or 4. Note that additional features shown in the embodiment of FIG. 5 could be applicable either to the embodiment of FIG. 1 or the embodiment of FIG. 4.

Subnormal compensation circuitry 510 is provided to handle the situation in which the biased exponents expa and expb are zero. If the smaller exponent bit is zero, then the smaller value is subnormal and the shifting perform by one of the shift circuits 140 is one bit too far to the right. This is fixed by performing a one bit left shift. Flush-to-zero (FZ) mode causes subnormal inputs to be treated as zeros. If this mode is set then the entire fraction is zeroed as part of the left shift. Note that in respect of the integer-bit calculation performed by the logic circuit 150, a biased exponent of zero implies that the corresponding integer-bit (the j bit) will also be zero, meaning that the shifted value will always be zero as well. It will appreciated that the circuitry of FIG. 1 can be easily modified to incorporate such subnormal compensation circuitry 510.

Unaligned significand providing circuitry 520 provides the unshifted larger significand of the first floating-point operand 110 and second floating-point operand 120. As with the subnormal compensation circuitry 510, a flush-to-zero mode makes it possible for subnormal inputs to be zeroed. The unaligned significand providing circuitry can be provided as part of the embodiment shown in FIG. 1 or FIG. 3.

Early rounding compensation circuitry 530a, 530b is provided to perform a one-bit left shift on both sigl and sigs (i.e. the smaller aligned significand and the unshifted larger significand) so that only two rounding locations need to be considered while performing rounding. In order to compensate for the possible 1-bit left shift at the split circuitry 320 and the group bit generation circuitry 330 as well as the calculation performed by the calculation circuitry 340, the significands are padded with an extra bit by the early rounding compensation circuitry. In the case of USAs, padding occurs by adding a zero on the right, in the case of LSAs, padding occurs by adding a zero on the left. The early rounding compensation circuitry 530a, 530b can be provided as part of the embodiment shown in FIG. 3.

The result of the addition performed by the (e.g. 107-bit) adder circuitry 370 is referred to as fsum (far path sum). The top 53-bits of this sum must be rounded by rounding circuitry 540. There is a one bit uncertainty about which are the top 53 bits, because the add performed by the adder circuitry 370 could generate a carry out, causing significand overflow. This is handled by adding the overflow bit fsum [106] at the overflow guard position, and the complement of the overflow bit at the normal guard position. Accordingly, there are four values to choose from: fsum[106:54], fsum [105:53], and the possibly incremented version of those 53-bit values. Rounding selection circuitry 550 determines which value to used based on the rounding computation and whether the original fsum has overflowed (i.e. bit fsum [106]). In addition, the sticky bit of fsum must be calculated by fsum sticky bit calculation circuitry 560. This is calculated by the logical OR calculated by the calculation circuitry 340 with the bottom bits of fsum.

A final selection circuit 570 is used to select between the calculation performed by the circuitry mentioned above or other circuits that may be used for other similar calculations. For example, the above circuitry is particularly suitable for far path calculations, which are either LSAs, or USAs where the exponents differ by two or more. In other cases, near path circuitry may be used. Furthermore, there may be special case circuitry that handles special values of the floating-point operands such as infinity and NaN. The final selection circuit 570 is therefore able to output a value from one of these circuits.

Figure 6:
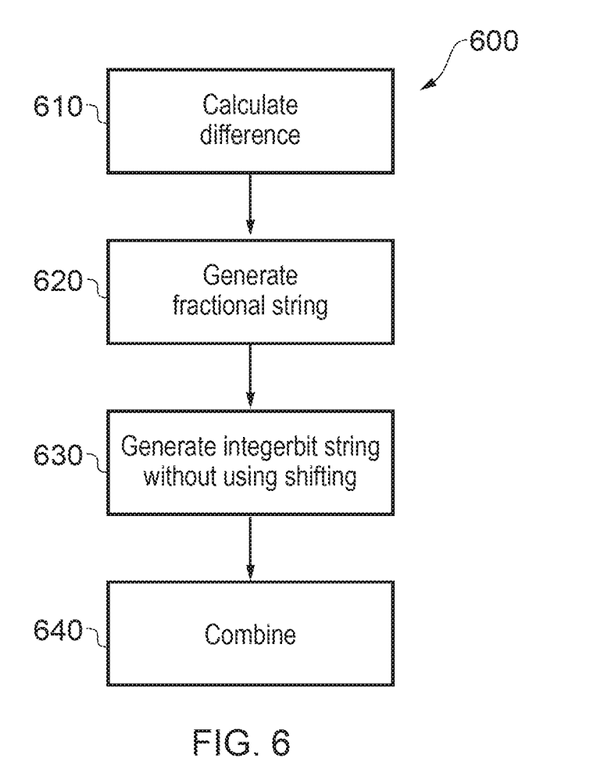
FIG. 6 illustrates a method of data processing in accordance with one embodiment.

FIG. 6 shows a flowchart 600 that illustrates a method of data processing in accordance with one embodiment.

At a step 610, a difference between exponents of a first floating-point operand and a second floating-point operand is determined. At a step 620, a fractional string is generated. This occurs by shifting fractional bits of a selected operand out of the first floating-point operand and the second floating-point operand. The amount of shifting depends on the difference between the exponents calculated in step 610. At a step 630, an integer-bit string is generated. The integer-bit string represents the integer-bit of the selected operand having been shifted based on the difference calculated in step 610, except that no shifting actually takes place. Finally, in a step 640, the fractional string and the integer-bit string are combined (e.g. through an OR operation). The result is a significand string that represents the operand having been shifted based on the difference between the exponents that was calculated in step 610.

Figure 7:
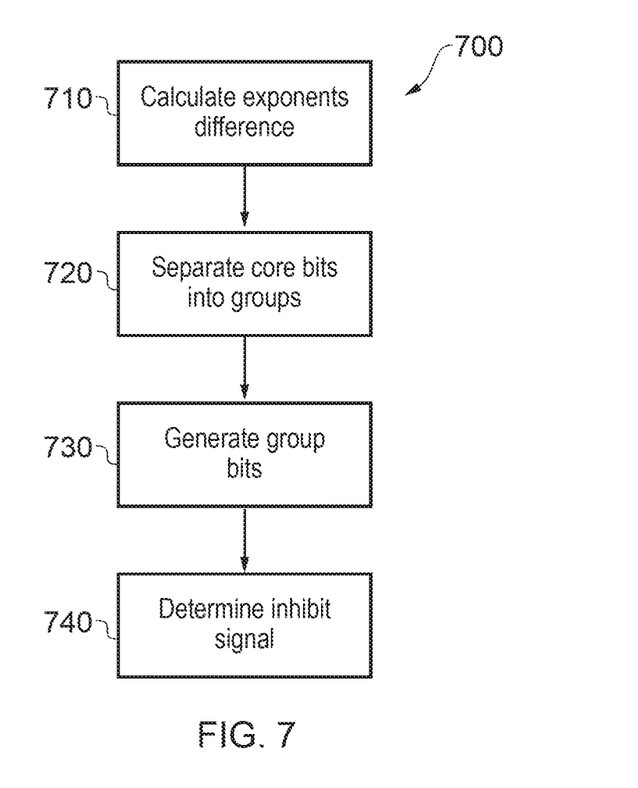
FIG. 7 illustrates a method of data processing in accordance with one embodiment.

FIG. 7 illustrates a flowchart 700 that illustrates a method of data processing in accordance with one embodiment.

At a step 710, a difference between exponents of a first floating-point operand and a second floating-point operand is determined. At a step 720, core bits of the significand of the first floating-point operand are separated into a plurality of groups of bits. Each of the groups of bits comprise contiguous bits from the core bits of the significand. At step 730, a plurality of group bits are generated. Each group bit is generated by performing a logical OR on the bits making up that group. A further group bit is generated by performing a logical OR on the outshifted bits. At step 740, an inhibit signal is determined. This is based on a logical OR of at least a subset of the plurality of group bits. The group bits included within the at least a subset of the plurality of group bits is determined based on the difference calculated in step 710.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
    difference circuitry to calculate a difference between exponents of a first floating-point operand and a second floating-point operand;
    shift circuitry to generate a fractional string by shifting fractional bits of a selected operand of said first floating-point operand and said second floating-point operand based on said difference;
    logic circuitry to generate an integer-bit string representing an integer-bit of said selected operand having been shifted based on said difference; and
    combining circuitry to combine said fractional string and said integer-bit string to produce a significand string representing said selected operand having been shifted based on said difference,
    wherein said logic circuitry is to generate said integer-bit string using operations other than shifting.

2. A data processing apparatus according to claim 1, wherein
    said logic circuitry is to generate said integer-bit string by performing, for each bit position in said integer-bit string, an associated computation using bits of said difference to determine a value for that bit position within said integer-bit string, said associated computation being different for different bit positions.

3. A data processing apparatus according to claim 1, wherein
    said associated computation for each bit position in said integer-bit string is at least logically equivalent to a computation that uses each bit of the exponent value at most once.

4. A data processing apparatus according to claim 3, wherein
    said associated computation for each bit position in said integer-bit string performs a sequence of logical operations on said bits of said difference.

5. A data processing apparatus according to claim 4, wherein
    said sequence of logical operations comprises one or more of AND, OR and NOT operations.

6. A data processing apparatus according to claim 1, wherein
    said logic circuitry is to operate at least partly in parallel with said difference circuitry.

7. A data processing apparatus according to claim 1, wherein
    said logic circuitry has a logic depth no greater than a logic depth of said difference circuitry.

8. A data processing apparatus according to claim 1, wherein
    said difference circuitry outputs said difference as a plurality of bits in order from least significant to most significant; and
    at least one of said shift circuitry and said logic circuitry generate said fractional string and said integer-bit string respectively based on a subset of least significant bits from said plurality of bits.

9. A data processing apparatus according to claim 8, wherein
    said subset of least significant bits from said plurality of bits comprises 4 bits.

10. A data processing apparatus according to claim 8, wherein
    said shifting circuitry is to generate said fractional string in response to a first bit being output by said difference circuitry.

11. A data processing apparatus according to claim 1, wherein
    said logic circuitry takes as inputs said difference and an indication of whether said integer-bit of said selected operand is zero.

12. A data processing apparatus according to claim 1, wherein
    said shift circuitry is further to expand said fractional string during said shifting, based on said difference.

13. A data processing apparatus according to claim 1, wherein
    one of said first floating-point operand and said second floating-point operand comprises a larger number of bits.

14. A data processing apparatus according to claim 1, comprising:
    a set of circuits comprising said difference circuitry, said shift circuitry, said logic circuitry, and said combining circuitry; and
    a further set of circuits comprising further difference circuitry, further shift circuitry, further logic circuitry, and further combining circuitry, wherein said difference circuitry and said further difference circuitry are to subtract an exponent of said selected operand from an exponent of said other operand; and said selected operand is different between said set of circuits and said further set of circuits.

15. A data processing apparatus according to claim 14, comprising:

selection circuitry to select from said significand string produced by said set of circuits and said significand string produced by said further set of circuits, wherein in response to said set of circuits having a smaller selected operand than in said set of further circuits, said selection circuitry selects said significand string produced by said set of circuits, otherwise said selection circuitry selects said significand string produced by said further set of circuits.

* * * * *